United States Patent
Sasaki

(10) Patent No.: US 8,232,757 B2
(45) Date of Patent: Jul. 31, 2012

(54) ROTATIONAL POSITION DETECTING METHOD FOR AC SERVOMOTOR AND SIMPLE ENCODER

(75) Inventor: Kozo Sasaki, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 481 days.

(21) Appl. No.: 12/601,112

(22) PCT Filed: May 30, 2007

(86) PCT No.: PCT/JP2007/000585
§ 371 (c)(1),
(2), (4) Date: Nov. 20, 2009

(87) PCT Pub. No.: WO2008/146336
PCT Pub. Date: Dec. 4, 2008

(65) Prior Publication Data
US 2010/0181956 A1    Jul. 22, 2010

(51) Int. Cl.
*G05B 19/29*    (2006.01)
(52) U.S. Cl. .................... 318/602; 318/727; 324/207.13
(58) Field of Classification Search .................. 318/600, 318/601, 602, 727, 400.4, 799
See application file for complete search history.

(56) References Cited

U.S. PATENT DOCUMENTS

| | | | | |
|---|---|---|---|---|
| 5,744,926 | A * | 4/1998 | Lai et al. | 318/590 |
| 6,111,384 | A * | 8/2000 | Stagnitto | 318/602 |
| 6,522,130 | B1 * | 2/2003 | Lutz | 324/207.2 |
| 6,738,679 | B2 * | 5/2004 | Fujita et al. | 700/56 |

FOREIGN PATENT DOCUMENTS

| | | |
|---|---|---|
| JP | 61-069386 A | 4/1986 |
| JP | 64-050786 A | 2/1989 |
| JP | 2002-051582 A | 2/2002 |

OTHER PUBLICATIONS

International Search Report (PCT/ISA/210) for PCT/JP2007/000585 mailed Aug. 21, 2007.

* cited by examiner

*Primary Examiner* — Rina Duda
(74) *Attorney, Agent, or Firm* — Buchanan Ingersoll & Rooney PC

(57) ABSTRACT

A motor rotational position detecting method detects the magnetic pole position of each phase of a three-phase AC servomotor, generates a three-phase square wave signal having a phase difference of 120 degrees, allocates data on the rotational position of a motor shaft to the edge of each square wave signal, calculates the rotational speed of the motor on the basis of the elapsed time from the previous edge detection point to this time edge detection point, and estimates the rotational position of the motor shaft at a certain period and outputs it on the basis of the rotational speed of the motor and the rotational position allocated to this time edge in the rotational section from this time edge detection point to the next edge detection point. As a result, a detection mechanism can be constructed with a small installation space and at low cost and the output of a high-resolution encoder can be obtained in a pseudo manner.

20 Claims, 3 Drawing Sheets

13: TIMER
11: EDGE DETECTOR
14: SPEED CALCULATION UNIT
12: DETERMINATION UNIT
15: CALCULATION UNIT
18: SERIAL BINARY DATA GENERATOR
17: ROTATION COUNT COMPUTATION UNIT
16: MEMORY

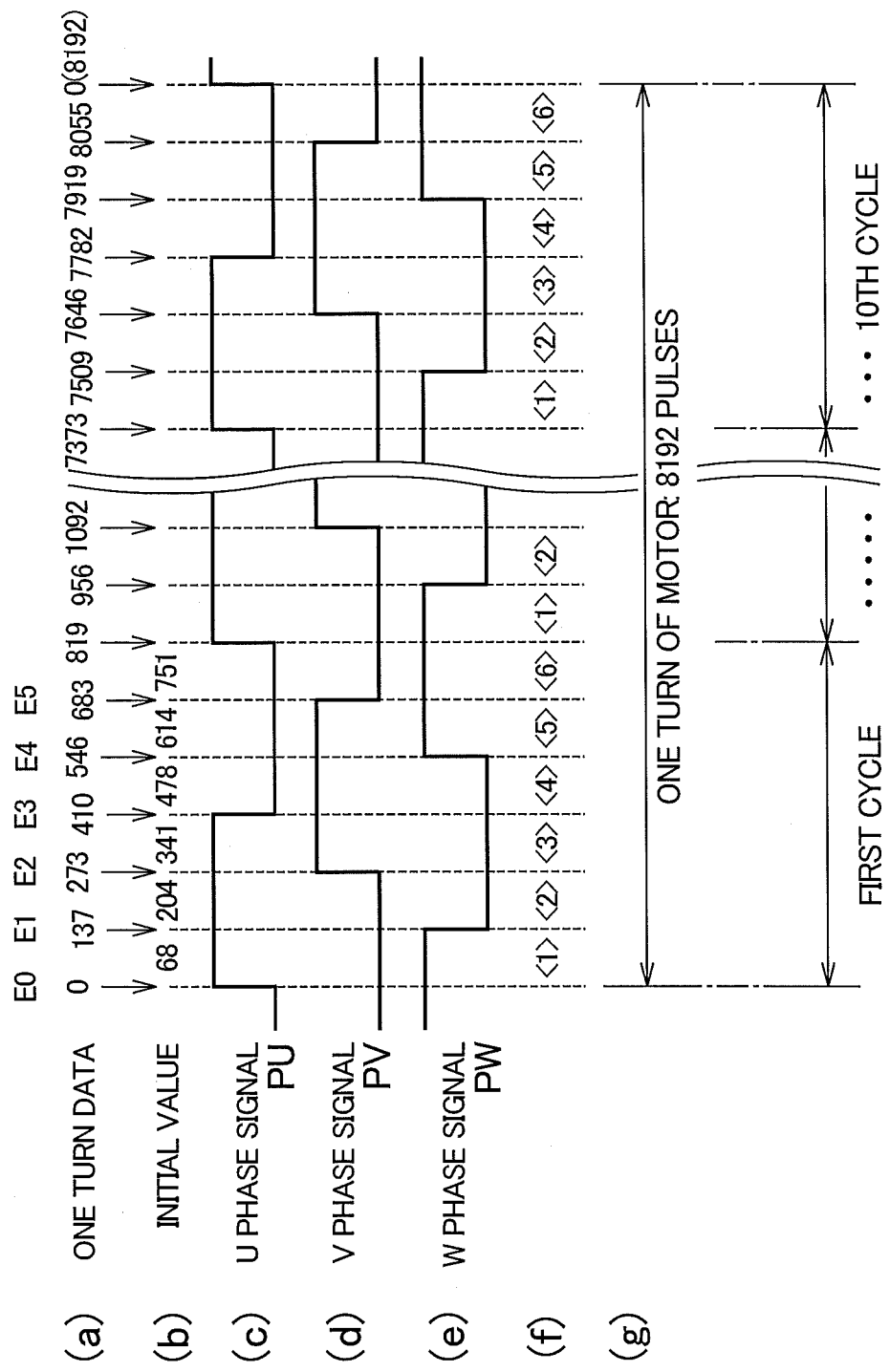

ROTATIONAL POSITION DETECTING METHOD FOR AC SERVOMOTOR AND SIMPLE ENCODER

TECHNICAL FIELD

The present invention relates to a method for detecting a rotational position of a AC servomotor, whereby the rotational position of a motor shaft can be detected using a simple detection mechanism for such purposes as controlling the speed of an AC servomotor, and to a simple encoder that employs this method.

BACKGROUND ART

Incremental-type encoders and absolute-type encoders for detecting the rotational position of the motor shaft of an AC servomotor require an optical or magnetic detector in order to ensure a predetermined resolution. A space for providing the detector must therefore be maintained at the rear end portion of the motor rotational shaft or elsewhere. A high-precision encoder plate and other expensive components are also necessary. As a result, it is sometimes difficult to maintain a space for building an encoder into a flat motor or the like having a short shaft length. The cost of the encoder and the motor into which the encoder is built also increase.

DISCLOSURE OF THE INVENTION

An object of the present invention in view of the foregoing is to provide a rotational position detecting method capable of detecting the rotational position of the motor shaft of an AC servomotor with a predetermined precision using an inexpensive, low-resolution structural component, and requiring only a small installation space for the detection mechanism. Another object of the present invention is to provide a simple encoder for detecting the rotational position of the motor by the method described above.

The method for detecting a rotational position of an AC servomotor of the present invention for overcoming the abovementioned problems is characterized in comprising:

detecting the magnetic pole position of each phase of a three-phase AC servomotor and generating a three-phase square wave signal having a phase difference of 120 degrees as a rotational shaft of the AC servomotor rotates;

outputting, as a rotational position of the motor shaft, rotational position data of the motor shaft allocated in advance to a detected edge of a square wave signal each time the edge is detected;

computing the rotational speed of the motor each time the edge of a square wave signal is detected, on the basis of the time elapsed from the previous edge detection time to a current edge detection time; and estimating the rotational position of the motor shaft at a certain period and outputting the estimated rotational position as the rotational position of the motor shaft in a rotational section from the current edge detection time to the next edge detection time, on the basis of the computed rotational speed of the motor and the rotational position allocated to the current edge.

An edge of the three-phase square wave signal is generated six times at equal angle intervals per electrical angle rotation. When the number of magnetic pole pairs of the rotor magnet is n (where n is a positive integer), an edge is detected (6 n) times during one rotation of the motor shaft. When data of the rotational position of the motor shaft are allocated in advance so as to correspond to each edge, detecting each edge enables the rotational position of the motor shaft to be detected at a resolution of (6 n).

The rotational position of the motor shaft in a rotational section between edges is computed at a certain period (predetermined resolution) on the basis of the rotational speed of the motor shaft computed each time an edge is detected. Consequently, the rotational position of the motor can be detected at an apparently high resolution that corresponds to the resolution of the signal processing circuit that performs the related computational processing.

Furthermore, the estimated rotational position is reset each time an edge is detected, and the rotational position data allocated to the detected edge are outputted as the rotational position of the motor. There is no significant divergence between the actual rotational position and the estimated rotational position, and there is also no lasting state of divergence.

The detection signal of the magnetic pole position of each phase of the AC servo motor can be directly obtained from the magnet rotor provided to the AC servo motor and a Hall element, MR element, or other magnetic sensor for detecting a magnetic pole. It is also sufficient merely to attach a magnetic pole detection magnet that is magnetized in the same manner as the magnet rotor instead of the magnet rotor, and there is no need to attach a high-resolution encoder plate. A low-resolution encoder plate in which slits are formed corresponding to each phase may be used even in the case of an optical magnetic sensor. Consequently, in any case, the detection mechanism can be formed at low cost, and only a small space is needed for installation.

Through the method of the present invention, the rotational position of the motor shaft can thus be detected with apparently high resolution using a magnetic pole detection mechanism in which high resolution is not required. Only a small space is thus needed to install the detection mechanism for detecting the rotational position of the motor shaft, and the cost thereof can also be reduced.

The initial rotational position of the motor shaft at the time the power supply is activated can then be estimated by the procedure described below. First, a rotational angle range that corresponds to one electrical angle rotation of the motor shaft is divided into six rotational sections, and a single initial rotational angle data is allocated to each rotational section on the basis of a combination of signal levels of the square wave signals. When the power supply is activated, the signal level of each square wave signal is detected, and the rotational section in which the motor rotational shaft is positioned among the six rotational sections is detected based on the detected signal level. The initial rotational position data allocated to the detected rotational section are outputted as the initial rotational position of the motor shaft for the time the power supply was activated.

In this case, it is sufficient insofar as rotational position data that correspond to the center position of each rotational section are allocated for each rotational section.

At the time the first edge is detected after activation of the power supply, the rotational speed of the motor is computed as the speed at which the motor shaft rotates through half a rotational section in the elapsed time from activation of the power supply to the time the edge is detected, and the rotational position of the motor in the rotational section between the first edge and the next edge is computed at a certain period using the computed rotational speed of the motor.

The simple encoder for an AC servomotor according to the present invention is characterized in comprising a magnetic pole detector for detecting each magnetic pole position of a three-phase AC servomotor and generating a three-phase square wave signal having a phase difference of 120 degrees; and a signal processing circuit for detecting the rotational position of a motor shaft of the AC servomotor on the basis of each square wave signal; wherein the signal processing circuit detects the rotational position of the motor shaft by the method described above.

It is sufficient if the signal indicating the rotational position of the motor shaft as outputted from the signal processing circuit is in the form of serial binary data or a two-phase pulse signal having a phase difference of 90 degrees, according to the encoder signal interface of the motor driver.

The method of the present invention can be applied in the same manner to a two-phase AC servomotor. In this case, the method of the present invention comprises detecting the magnetic pole position of each phase of a two-phase AC servomotor; generating a two-phase square wave signal having a phase difference of 90 degrees as a rotational shaft of the AC servomotor rotates; outputting, as a rotational position of the motor shaft, rotational position data of the motor shaft allocated in advance to a detected edge of a square wave signal each time the edge is detected; computing the rotational speed of the motor each time the edge of a square wave signal is detected, on the basis of the time elapsed from the previous edge detection time to a current edge detection time; and estimating the rotational position of the motor shaft at a certain period and outputting the estimated rotational position as the rotational position of the motor shaft in a rotational section from the current edge detection time to the next edge detection time, on the basis of the computed rotational speed of the motor and the rotational position allocated to the current edge.

This method also comprises dividing a rotational angle range that corresponds to one electrical angle rotation of the motor shaft into four rotational sections and allocating a single rotational angle position data to each rotational section on the basis of a combination of signal levels of the square wave signals; detecting the signal level of each square wave signal when a power supply is activated; detecting in which of the four rotational sections the motor rotational shaft is positioned on the basis of the detected signal level; and outputting the rotational position data allocated to the detected rotational section as the initial rotational position of the motor shaft at the time of power supply activation.

Furthermore, it is sufficient insofar as rotational position data corresponding to a center position of each rotational section are allocated for each rotational section.

Furthermore, it is sufficient insofar as the rotational speed of the motor is computed as the speed at which the motor shaft rotates through half a rotational section in the elapsed time from activation of the power supply to detection of the edge when the first edge is detected after activation of the power supply.

Next, the simple encoder for an AC servomotor according to the present invention is characterized in comprising a magnetic pole detector for detecting each magnetic pole position of a two-phase AC servomotor and generating a two-phase square wave signal having a phase difference of 90 degrees; and a signal processing circuit for detecting the rotational position of a motor shaft of the AC servomotor on the basis of each square wave signal; wherein the signal processing circuit detects the rotational position of the motor shaft by the method described above. The signal processing circuit may be configured so as to output the rotational position of the motor rotational shaft in the form of serial binary data or a two-phase pulse signal that has a phase difference of 90 degrees.

BRIEF DESCRIPTION OF THE DRAWINGS

FIG. 3 is an operational diagram showing the operation of the simple encoder of FIG. 1 for detecting the rotational position of the motor rotational shaft.

BEST MODE FOR CARRYING OUT THE INVENTION

Embodiments of the AC servomotor system to which the present invention is applied will be described hereinafter with reference to the drawings.

Figure 1:
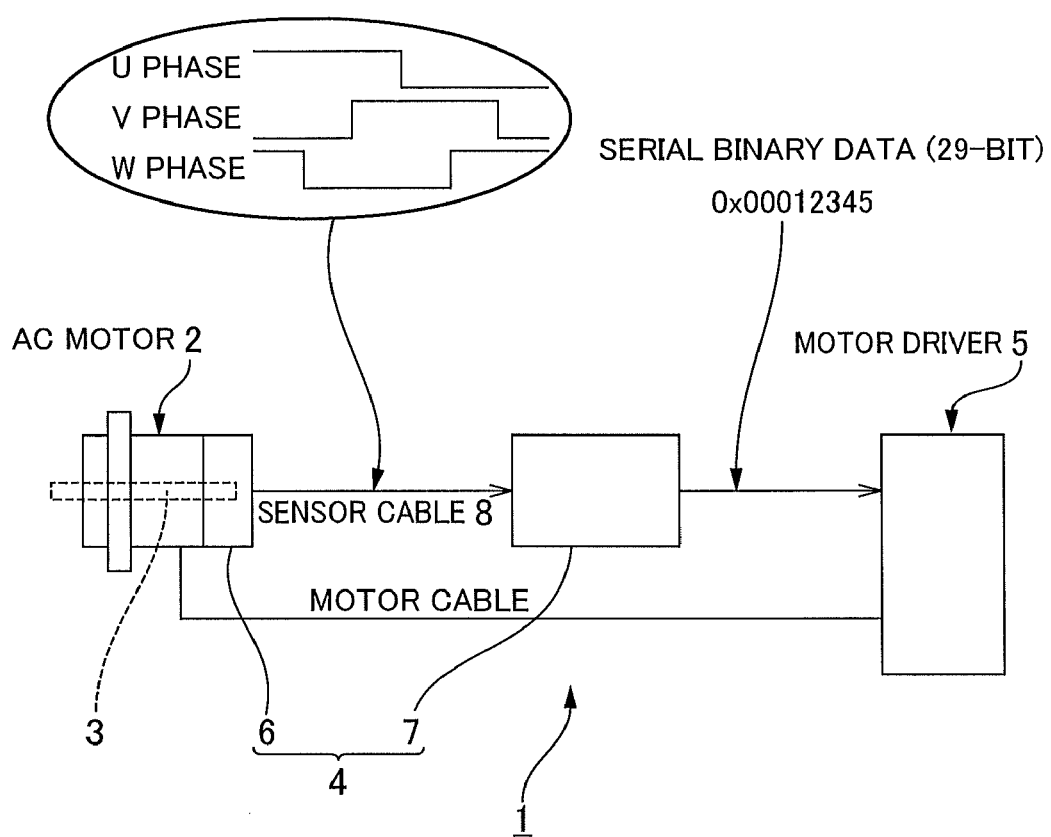
FIG. 1 is a schematic structural view showing the speed control system for an AC servomotor provided with a simple encoder to which the present invention is applied.

FIG. 1 is a schematic structural view showing the AC servomotor system. The AC servomotor system 1 has a three-phase AC servomotor 2; a simple encoder 4 for detecting the rotational position of a motor shaft 3 of the AC servomotor 2; and a motor driver 5 for driving and controlling the speed of the AC servomotor 2 on the basis of the output of the simple encoder 4. The AC servomotor 2 is a 20 pole motor, for example.

The simple encoder 4 is an incremental-type encoder in which the resolution of one turn of the motor rotational shaft is 8192 (13 bits), and the multi-turn count is 16-bit, for example. The rotational position data are outputted and fed to the motor driver 5 in the form of serial binary data composed of a total of 29 bits, including 13 bits of data indicating the rotational position within a single rotation, and 16 bits of data indicating the number of rotations.

The simple encoder 4 is provided with a UVW magnetic pole detector 6 for detecting the U, V, W three-phase magnetic pole position of the AC servomotor 2 and generating three phases of square wave signals PU, PV, PW having a phase difference of 120 degrees that correspond to the magnetic pole position; and a signal processing circuit 7 for detecting the rotational position of the motor shaft 3 on the basis of the three phases of square wave signals PU, PV, PW; and the UVW magnetic pole detector 6 and signal processing circuit 7 are connected by a sensor cable 8. It is also possible for the magnetic pole detector 6 and signal processing circuit 7 to be integrally formed with each other and mounted to the AC servomotor 2. In the case of a 20 pole motor, 10 cycles of each phase of square wave signal PU, PV, PW are outputted per rotation, and one cycle (one electrical angle rotation) of each square wave signal corresponds to 36 degrees of rotation (mechanical angle) of the motor shaft 3.

The UVW magnetic pole detector 6 may be mounted on the side of the AC servomotor 2 and composed of the magnet rotor (not shown) of the AC servomotor 2, three Hall elements, MR elements, or other magnetic sensors for magnetic pole detection that are arranged so that a detection signal having a phase difference of 120 degrees is obtained, and a signal processor for generating a square wave signal. A magnetic pole detection magnet that is magnetized with 20 poles in the same manner as the magnet rotor may be attached to the motor shaft 3 instead of the magnet rotor. An optical magnetic detector can be formed by an encoder plate in which slits are formed corresponding to the number of magnetic pole pairs (10), a light-emitting element and a light-receiving element arranged facing each other so as to sandwich the encoder plate, and a signal processor for generating a three-phase square wave signal on the basis of the output of the light-receiving element. In any of these cases, since there is no need to attach a high-resolution encoder plate, the detection mechanism can be inexpensively formed, and minimal installment space is needed.

Figure 2:
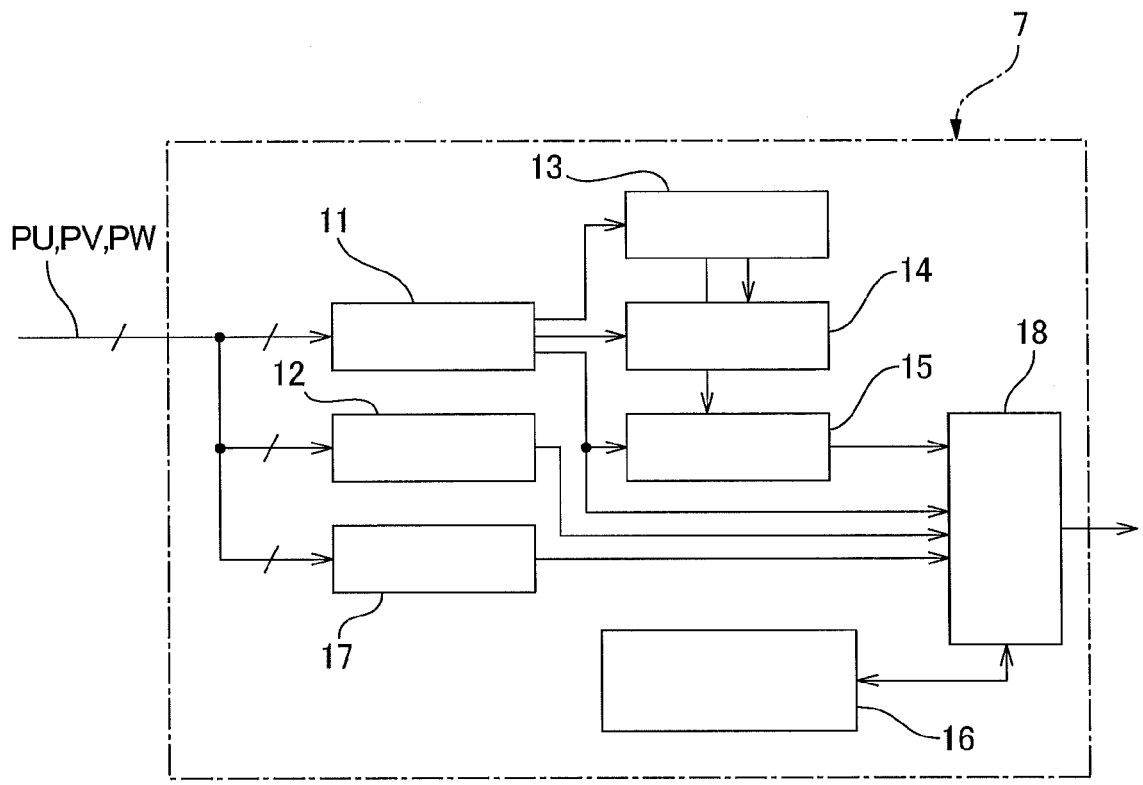
FIG. 2 is a functional block diagram showing the signal processing circuit of FIG. 1.

FIG. 2 is a functional block diagram showing the signal processing circuit 7. The signal processing circuit 7 can be formed mainly by a microcomputer, for example, and performs the functions shown in the drawing by executing a control program that is stored in ROM. As shown in the drawing, the signal processing circuit 7 is provided with an edge detector 11 for detecting the rising edge and falling edge of the supplied three phases of square wave signals PU, PV, PW; a determination unit 12 for determining which section the rotational position of the motor shaft 3 is in on the basis of a logical level of the square wave signal; a timer 13; a speed calculation unit 14 for computing the speed of the motor shaft 3; a calculation unit 15 for computing the rotational position of the motor shaft 3 between edges at a certain period and estimating the rotational position of the motor shaft; a memory 16; a rotation count computation unit 17; and a serial binary data generator 18.

(Operation for Computing the Rotational Position)

FIG. 3 is an operational diagram showing the rotational position computation operation of the simple encoder 4. The rotational position computation operation will be described with reference to FIG. 3.

As previously mentioned, the simple encoder 4 is an incremental-type encoder in which the resolution of one turn of the motor rotational shaft is 8192 (13 bits), and the multi-turn count is 16-bit. The rotational position data are outputted and fed to the motor driver 5 in the form of serial binary data composed of a total of 29 bits, including 13 bits of data indicating the rotational position within a single rotation, and 16 bits of data indicating the number of rotations.

The three phases of square wave signals including a U-phase signal PU, a V-phase signal PV, and a W-phase signal PW fed from the UVW magnetic pole detector 6 are outputted as 10 cycles in one rotation in the case of a 20 pole motor, as shown in FIGS. 3(c), 3(d), and 3(e). One cycle corresponds to 36 degrees (=360 degrees/10) in terms of mechanical angle, and is divided into six sections (1) through (6) according to the combination of logical levels of the three phases of square wave signals. Since each phase of square wave signals has 10 cycles per rotation of the motor, and each cycle is divided into six sections (1) through (6), the resolution per rotation of the motor is 60 pulses (=10 6).

As shown in FIG. 3(a), 13 bits of data are allocated to the edges B0 through E5 of one cycle. For example, rotational position data corresponding to "0," "137," "273," "410," "546," and "683" are allocated to the edges E0 through E5, respectively. As shown in FIG. 3(b), initial rotational position data corresponding to "68," "204," "341," "478," "614," and "751" as initial values are allocated to rotational sections (1) through (6) respectively. Correspondence tables for these data are stored and retained in advance in the memory 16.

The determination unit 12 of the signal processing circuit 7 detects the signal levels of the U-phase signal PU, V-phase signal PV, and W-phase signal PW at the time of power supply activation, and detects which of the six rotational sections (1) through (6) that the rotational position of the motor shaft 3 is in on the basis of the detected signal levels. The initial rotational position data allocated to the detected rotational section are read from the memory 16. The initial rotational position data are converted to serial binary data in the serial binary data generator 18 and outputted to the motor driver 5 as the initial rotational position of the motor shaft 3 at the time the power supply was activated.

In the present example, the center positions of the rotational sections (1) through (6) are allocated as initial rotational position data. Positions other than the center positions may also be allocated in advance as the initial rotational position data.

The first edge after power supply activation is then detected by the edge detector 11 of the signal processing circuit 7 as the motor shaft 3 rotates. When an edge is detected, the rotational position data allocated to the edge are read from the memory 16 and outputted as the rotational position of the motor shaft 3.

The timer 13 counts the elapsed time from activation of the power supply to detection of the edge. When the edge is detected, the rotational speed of the motor is computed by the speed calculation unit 14 as the speed at which the motor shaft 3 rotates through half of the rotational section. Specifically, the rotational speed of the motor is computed as the speed of rotation through 3 degrees (=36 degrees/12) in terms of mechanical angle.

Then, with the assumption that the motor shaft 3 is rotating at the computed rotational speed of the motor, the rotational position of the motor is estimated at a certain period corresponding to a 13-bit resolution in the calculation unit 15. The estimated rotational position is outputted as the rotational position of the motor shaft 3.

Then, each time the edge of a square wave signal is detected, the calculation unit 15 is reset, and the rotational position data of the motor shaft 3 allocated in advance to the detected edge are outputted as the rotational position of the motor shaft 3. Each time the edge of a square wave signal is detected, the rotational speed of the motor is computed by the speed calculation unit 14 on the basis of the elapsed time from the previous edge detection point to the current edge detection point. In the calculation unit 15, the rotational position of the motor rotational shaft is estimated at a certain period, and the estimated rotational position is outputted as the rotational position of the motor shaft on the basis of the computed rotational speed of the motor and the rotational position allocated to the current edge in the rotational section from the current edge detection point to the next edge detection point.

The rotational position data within one rotation from the time of power supply activation are thus outputted at 13-bit resolution, as shown in FIG. 3(a). In the rotation count computation unit 17 in the signal processing circuit 7, the rotation direction of the motor shaft 3 is computed based on the three phases of square wave signals, and when the rotational position data within one rotation exceeds the position of "0," the multi-turn data are increased by "1" or "−1" according to the transit direction (rotation direction). The multi-turn data are converted to 16-bit data in the serial binary data generator 18, and combined with 13 bits of rotational position data and fed to the motor driver 5 as 29-bit serial binary data.

(Other Embodiments)

The example described above pertained to the present invention applied to detecting the rotational position of a three-phase AC servomotor. The present invention can also be applied to detect the rotational position of a two-phase AC servomotor. In this case, a two-phase square wave signal having a phase difference of 90 degrees may be obtained from the magnetic pole detector, and one cycle thereof may be divided into four sections according to a combination of the logical levels of the square wave signal. Consequently, the rotational position of the motor rotational shaft can be detected at an apparently high resolution in the same manner as in the case of a three-phase AC servomotor.

The invention claimed is:

1. A method for detecting a rotational position of an AC servomotor, comprising:
   detecting the magnetic pole position of each phase of a three-phase AC servomotor;
   generating a three-phase square wave signal having a phase difference of 120 degrees as a rotational shaft of the AC servomotor rotates;
   outputting, as a rotational position of the motor shaft, rotational position data of the motor shaft allocated in advance to a detected edge of a square wave signal each time the edge is detected;
   computing the rotational speed of the motor each time the edge of a square wave signal is detected, on the basis of the time elapsed from the previous edge detection time to a current edge detection time; and
   estimating the rotational position of the motor shaft at a certain period and outputting the estimated rotational position as the rotational position of the motor shaft in a rotational section from the current edge detection time to the next edge detection time, on the basis of the computed rotational speed of the motor and the rotational position allocated to the current edge.

2. The method for detecting a rotational position of an AC servomotor according to claim 1, further comprising:
   dividing a rotational angle range that corresponds to one electrical angle rotation of the motor shaft into six rotational sections and allocating a single rotational position angle data to each rotational section on the basis of a combination of signal levels of the square wave signals;
   detecting the signal level of each square wave signal when a power supply is activated;
   detecting in which of the six rotational sections the motor rotational shaft is positioned on the basis of the detected signal level; and
   outputting the rotational position data allocated to the detected rotational section as the initial rotational position of the motor shaft at the time of power supply activation.

3. The method for detecting a rotational position of an AC servomotor according to claim 2, wherein rotational position data corresponding to a center position of each rotational section are allocated for each rotational section.

4. The method for detecting a rotational position of an AC servomotor according to claim 3, wherein the rotational speed of the motor is computed as the speed at which the motor shaft rotates through half a rotational section in the elapsed time from activation of the power supply to detection of the edge when the first edge is detected after activation of the power supply.

5. A simple encoder for an AC servomotor, comprising:
   a magnetic pole detector for detecting each magnetic pole position of a three-phase AC servomotor and generating a three-phase square wave signal having a phase difference of 120 degrees; and
   a signal processing circuit for detecting the rotational position of a motor shaft of the AC servomotor on the basis of each square wave signal; wherein
   the signal processing circuit detects the rotational position of the motor shaft by the method according to claim 1.

6. The simple encoder for an AC servomotor according to claim 5, wherein the signal processing circuit outputs the rotational position of the motor shaft in the form of serial binary data.

7. The simple encoder for an AC servomotor according to claim 5, wherein the signal processing circuit outputs the rotational position of the motor shaft in the form of a two-phase pulse signal having a phase difference of 90 degrees.

8. A simple encoder for an AC servomotor, comprising:
   a magnetic pole detector for detecting each magnetic pole position of a three-phase AC servomotor and generating a three-phase square wave signal having a phase difference of 120 degrees; and
   a signal processing circuit for detecting the rotational position of a motor shaft of the AC servomotor on the basis of each square wave signal; wherein
   the signal processing circuit detects the rotational position of the motor shaft by the method according to claim 2.

9. A simple encoder for an AC servomotor, comprising:
   a magnetic pole detector for detecting each magnetic pole position of a three-phase AC servomotor and generating a three-phase square wave signal having a phase difference of 120 degrees; and
   a signal processing circuit for detecting the rotational position of a motor shaft of the AC servomotor on the basis of each square wave signal; wherein
   the signal processing circuit detects the rotational position of the motor shaft by the method according to claim 3.

10. A simple encoder for an AC servomotor, comprising:
    a magnetic pole detector for detecting each magnetic pole position of a three-phase AC servomotor and generating a three-phase square wave signal having a phase difference of 120 degrees; and
    a signal processing circuit for detecting the rotational position of a motor shaft of the AC servomotor on the basis of each square wave signal; wherein
    the signal processing circuit detects the rotational position of the motor shaft by the method according to claim 4.

11. A method for detecting a rotational position of an AC servomotor, comprising:
    detecting the magnetic pole position of each phase of a two-phase AC servomotor;
    generating a two-phase square wave signal having a phase difference of 90 degrees as a rotational shaft of the AC servomotor rotates;
    outputting, as a rotational position of the motor shaft, rotational position data of the motor shaft allocated in advance to a detected edge of a square wave signal each time the edge is detected;
    computing the rotational speed of the motor each time the edge of a square wave signal is detected, on the basis of the time elapsed from the previous edge detection time to a current edge detection time; and
    estimating the rotational position of the motor shaft at a certain period and outputting the estimated rotational position as the rotational position of the motor shaft in a rotational section from the current edge detection time to the next edge detection time, on the basis of the computed rotational speed of the motor and the rotational position allocated to the current edge.

12. The method for detecting a rotational position of an AC servomotor according to claim 11, further comprising:
    dividing a rotational angle range that corresponds to one electrical angle rotation of the motor shaft into four rotational sections and allocating a single rotational angle position data to each rotational section on the basis of a combination of signal levels of the square wave signals;
    detecting the signal level of each square wave signal when a power supply is activated;
    detecting in which of the four rotational sections the motor rotational shaft is positioned on the basis of the detected signal level; and outputting the rotational position data allocated to the detected rotational section as the initial rotational position of the motor shaft at the time of power supply activation.

13. The method for detecting a rotational position of an AC servomotor according to claim 12, wherein rotational position data corresponding to a center position of each rotational section are allocated for each rotational section.

14. The method for detecting a rotational position of an AC servomotor according to claim 13, wherein the rotational speed of the motor is computed as the speed at which the motor shaft rotates through half a rotational section in the elapsed time from activation of the power supply to detection of the edge when the first edge is detected after activation of the power supply.

15. A simple encoder for an AC servomotor, comprising:
a magnetic pole detector for detecting each magnetic pole position of a two-phase AC servomotor and generating a two-phase square wave signal having a phase difference of 90 degrees; and
a signal processing circuit for detecting the rotational position of a motor shaft of the AC servomotor on the basis of each square wave signal; wherein
the signal processing circuit detects the rotational position of the motor shaft by the method according to claim 11.

16. A simple encoder for an AC servomotor, comprising:
a magnetic pole detector for detecting each magnetic pole position of a two-phase AC servomotor and generating a two-phase square wave signal having a phase difference of 90 degrees; and
a signal processing circuit for detecting the rotational position of a motor shaft of the AC servomotor on the basis of each square wave signal; wherein
the signal processing circuit detects the rotational position of the motor shaft by the method according to claim 12.

17. A simple encoder for an AC servomotor, comprising:
a magnetic pole detector for detecting each magnetic pole position of a two-phase AC servomotor and generating a two-phase square wave signal having a phase difference of 90 degrees; and
a signal processing circuit for detecting the rotational position of a motor shaft of the AC servomotor on the basis of each square wave signal; wherein
the signal processing circuit detects the rotational position of the motor shaft by the method according to claim 13.

18. A simple encoder for an AC servomotor, comprising:
a magnetic pole detector for detecting each magnetic pole position of a two-phase AC servomotor and generating a two-phase square wave signal having a phase difference of 90 degrees; and
a signal processing circuit for detecting the rotational position of a motor shaft of the AC servomotor on the basis of each square wave signal; wherein
the signal processing circuit detects the rotational position of the motor shaft by the method according to claim 14.

19. The simple encoder for an AC servomotor according to claim 15, wherein the signal processing circuit outputs the rotational position of the motor shaft in the form of serial binary data.

20. The simple encoder for an AC servomotor according to claim 15, wherein the signal processing circuit outputs the rotational position of the motor shaft in the form of a two-phase pulse signal having a phase difference of 90 degrees.

* * * * *